United States Patent
Tadano

(10) Patent No.: US 8,232,759 B2
(45) Date of Patent: Jul. 31, 2012

(54) PSEUDO CURRENT TYPE 120-DEGREE CONDUCTION INVERTER

(75) Inventor: Yugo Tadano, Tokyo (JP)

(73) Assignee: Meidensha Corporation, Tokyo (JP)

(*) Notice: Subject to any disclaimer, the term of this patent is extended or adjusted under 35 U.S.C. 154(b) by 445 days.

(21) Appl. No.: 12/600,551

(22) PCT Filed: Jun. 12, 2008

(86) PCT No.: PCT/JP2008/060771
§ 371 (c)(1),
(2), (4) Date: Nov. 17, 2009

(87) PCT Pub. No.: WO2009/001686
PCT Pub. Date: Dec. 31, 2008

(65) Prior Publication Data
US 2010/0148711 A1     Jun. 17, 2010

(30) Foreign Application Priority Data
Jun. 27, 2007 (JP) .................................. 2007-168631

(51) Int. Cl.
*H02P 1/24* (2006.01)
(52) U.S. Cl. ........................................ 318/727; 318/801
(58) Field of Classification Search .................. 318/727, 318/798, 799, 801, 802, 805, 812
See application file for complete search history.

(56) References Cited

U.S. PATENT DOCUMENTS

| | | | |
|---|---|---|---|
| 4,713,590 A * | 12/1987 | Ohno ........................ | 318/400.23 |
| 5,821,710 A | 10/1998 | Masuzawa et al. | |
| 5,900,709 A * | 5/1999 | Kanda et al. ................... | 318/652 |
| 2003/0025475 A1* | 2/2003 | Won et al. ..................... | 318/701 |

FOREIGN PATENT DOCUMENTS

| | | |
|---|---|---|
| DE | 10 2004 062 821 A1 | 7/2006 |
| JP | 62-48198 U | 3/1987 |
| JP | 10-155262 A | 6/1998 |
| JP | 2002-223580 A | 8/2002 |
| JP | 2006-129570 A | 5/2006 |
| WO | WO 2006/069844 A1 | 11/2005 |

OTHER PUBLICATIONS

Toshihiko Noguchi et al., "220000-r/min, 2-kW PM Motor Drive for Turbocharger", Electric Engineering Society of Japan, IEEJ Trans. IA, vol. 125, No. 9 (2005), pp. 854-861.

(Continued)

*Primary Examiner* — Rina Duda
(74) *Attorney, Agent, or Firm* — Foley & Lardner LLP

(57) ABSTRACT

[Problem] In a pseudo-current source inverter which drives a motor at a high speed, a current phase adjustment is assured and facilitated to perform a field-weakening control or suppress a terminal voltage saturation at a time of the high-speed motor drive.
[Means For Solving Problem]
A phase advance correction is carried out for a magnetic flux phase information from which a 120 degree conduction pattern is obtained with a motor terminal voltage as a reference phase. The phase advance correction includes the correction of differentiating the terminal voltage detection signals of the motor, the adjustment of enlarging the phase advance correction quantity in a case where the motor load current is large, and delays the gate signals of the 120 degree conduction pattern in accordance with the speed estimation value through a delay counter and carries out the phase advance correction as the rising edge timing of the subsequent gate signal at the subsequent step phase. Furthermore, the error correction is carried out for the phase advance correction quantity in accordance with a variation tendency of the speed estimation value and a detection value of a direct current of the inverter.

12 Claims, 16 Drawing Sheets

OTHER PUBLICATIONS

Toshihiko Noguchi, et al., "160,000-r/min, 2.7-kW Electric Drive of Supercharger for Automobiles", PEDS 2005, International Conference, vol. 2, pp. 1380-1385.

Toshihiko Noguchi et al., "Turbocharger-yo 220000r/min-2-kW PM Motor Kudo System", The Institute of Electrical Engineers of Japan, (Sep. 1, 2005), 4 pgs.

* cited by examiner

FIG.3
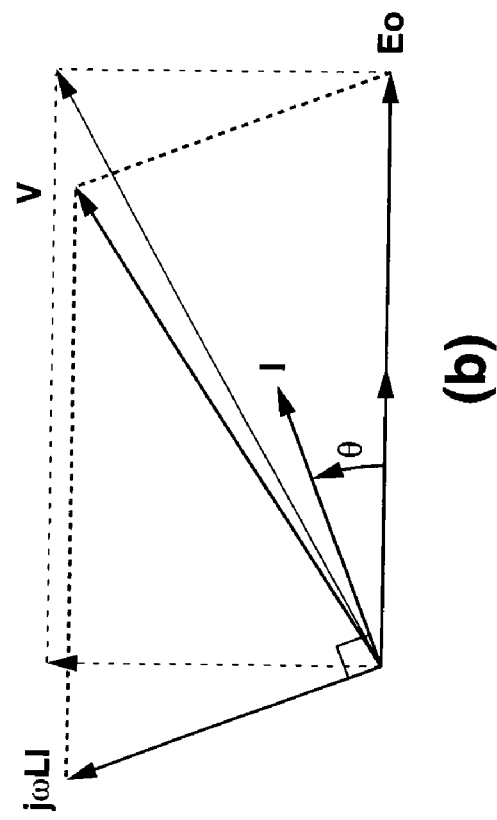
(b)
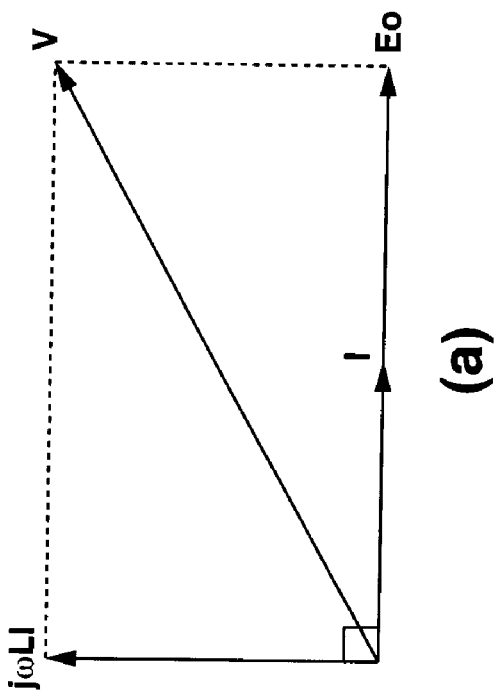
(a)

PSEUDO CURRENT TYPE 120-DEGREE CONDUCTION INVERTER

TECHNICAL FIELD

The present invention relates to an inverter control apparatus which drives a motor at a high speed and, particularly, relates to a pseudo current type 120-degree conduction inverter.

BACKGROUND ART

The present invention relates to "pseudo current type 120-degree conduction inverter" and proposes a control apparatus of a motor to drive the motor at the high speed using the pseudo current type 120-degree conduction inverter.

In general, a use of a voltage source PWM inverter for the motor drive apparatus is a major trend. However, in a purpose in which a motor of a class of several kW is driven at a high speed equal to or higher than 100 thousand revolutions per minute, a fundamental wave frequency is as very high as several kHz or more. Therefore, a further higher carrier frequency than the fundamental wave frequency is required to perform a PWM control and, hence, a control is difficult. In addition, in a voltage type 120 degree conduction inverter, current waveforms are worsened during the high-speed drive.

From the above reason, as the apparatus which drives the motor at the high speed, "pseudo current type 120-degree inverter" which performs a PAM control (Pulse Amplitude Modulation control) of an amplitude of an output current and performs a 120 degree conduction control of an output phase has been discussed. A system in which a PM (permanent magnet) motor is controlled by means of the pseudo current type 120-degree conduction inverter has been reported (for example, refer to a non-patent literature 1).

In this system, as shown in a circuit structure example of FIG. 15, a main circuit is constituted by a buck chopper 1 which performs a direct current voltage control and a 120 degree conduction inverter 2 and a control circuit 4 controls buck chopper 1 and inverter 2 so as to enable a high-speed drive for an alternating current motor 3.

In control circuit 4, a detection current of a reactor L of buck chopper 1 in which a direct current voltage is inputted is fed back and switching conductivities of semiconductor switches S1, S2 are controlled to control the direct current voltage of the inverter. A diode 5 returns a high voltage generated at a winding inductance of the motor when the semiconductor switches of inverter 2 are commutated at each of 120 degrees toward a direct current voltage source side.

In addition, control circuit 4 detects three-phase voltages of the motor on the basis of magnetic flux phases of the motor and integrates voltage waveforms of the detected three-phase voltages by an integration circuit having a large time constant to be converted into a magnetic flux phase information (an inner induced voltage phase), this being under a zero cross detection by means of a zero crossing comparator. Then, a logic circuit is intervened to generate a 120 degree conduction pattern synchronized with the inner induced voltage phase of the motor.

As another form of FIG. 15, another pseudo current type 120-degree conduction inverter whose main circuit structure is shown in FIG. 16 or FIG. 17 has been proposed. In FIG. 16, a voltage boost direct current power is obtained by means of a voltage boost circuit 6 in FIG. 16. This structure achieves the inverter using a low voltage direct current power supply such as an on-vehicle battery. In FIG. 17, a rectifying circuit 9 serves to obtain a high-voltage direct current power from a three-phase alternating current power supply and this direct current is controlled by buck chopper 10.

Non-patent literature 1: Japanese publication "pp. 854-861, No. 9, Electric Engineering Society of Japan titled 220000-r/min, 2-kW PM Motor Drive for Turbocharger".

DISCLOSURE OF THE INVENTION

As described above, non-patent literature 1 describes the pseudo current type 120-degree conduction inverter in which three-phase voltage waveforms are integrated by means of an integration circuit having a sufficiently large time constant to obtain a magnetic flux phase information, zero crossing points of the magnetic flux phase information providing magnetic flux phase signals. In this system, the motor terminal voltage includes a phase error due to influences of a leakage inductance of the motor and a leakage resistance. In order to avoid the influence of this phase error, a simulation result of non-patent literature 1 is obtained which can achieve improvements in an efficiency and in a power factor and an expansion of a motor output range by slightly delaying an output current phase of the inverter on the basis of a calculation result with direct current and revolution speed information as parameters.

It should be noted that, in the PM (permanent magnet) motor, at a time at which the motor is driven at the high speed, the induced voltage is raised so that a voltage saturation occurs and a drive torque becomes insufficient. Therefore, a sufficient torque cannot be obtained at such a high revolution region as described above. As a system which eliminates a problem of this induced voltage saturation, it is known that a field-weakening control is carried out by providing an advance phase for the output current phase with respect to the induced voltage or the field-weakening control is carried out by performing a rotational coordinate conversion to control a direct current quantity on the coordinate (d axis), in a voltage source inverter.

However, since, in a current type 120-degree conduction inverter, to perform a commutation instantaneously from one phase in which the current is caused to flow to the subsequent phase, a current waveform is rectangular having a steep gradient. Even if this current is directly under the phase control, an adjustment of the induced voltage cannot be made. Consequently, the induced voltage is saturated during the high revolution region and the drive torque becomes insufficient. That is to say, the induced voltage is expressed in a differentiation of the magnetic flux (current). If the gradient of the current is theoretically 0 or infinite rectangular, the induced voltage expressed as the differentiation value provides 0 direct current or clamped direct current. If the current is under the phase control, only the phase of the induced voltage is deviated and the problem of the saturation of the induced voltage cannot be eliminated.

It is an object of the present invention to provide a pseudo current type 120-degree conduction inverter which assures and facilitates the current phase adjustment and can perform the field-weakening control of the motor or suppress the terminal voltage saturation during the high speed drive of the motor.

To solve the above-described problem, according to the present invention, a phase advance correction is performed for the magnetic flux phase information from which a 120 degree conduction pattern of the inverter is obtained with the motor terminal voltage as a reference phase. The present invention has the following structural features.

(1) According to one aspect of the present invention, a pseudo current type 120 degree conduction inverter, comprises: means for detecting a motor magnetic flux phase from terminal voltage detection signals of a motor; means for generating gate signals of the inverter from a 120 degree conduction pattern on the basis of the magnetic flux phase; means for controlling a magnitude of an output current of the inverter through an estimation of a motor revolution speed based on the magnetic flux phase; and phase advance correcting means for performing a phase advance correction of the detected magnetic flux phase then performing a field-weakening control of the motor or suppressing a terminal voltage saturation of the motor.

(2) According to another aspect of the present invention, the phase advance correcting means is a differentiator that differentiates the terminal voltage detection signal of the motor.

(3) According to another aspect of the present invention, the pseudo current type 120 degree conduction inverter further comprises: means for detecting a direct current of the inverter and adjusting a phase advance correction quantity of the phase advance correcting means in a manner that, as a detection value of the direct current of the inverter becomes larger, the phase advance correction quantity of the phase advance correcting means becomes larger.

(4) According to a still another aspect of the present invention, the phase advance correcting means is a phase advance correction circuit which determines a timing that is delayed from a timing of a rising edge or a falling edge of the gate signal pulse of the 120 degree conduction pattern in accordance with a motor speed estimation value by means of a delay counter, and which sets the delayed timing to the timing of the rising edge of a subsequent gate signal pulse.

(5) According to a still further aspect of the present invention, the phase advance correction circuit has phase advance error correcting means for detecting a variation tendency of the motor speed estimation value and performing a phase advance error correction of the phase advance correction quantity.

(6) According to another aspect of the present invention, the phase advance error correcting means detects the variation tendency of the speed estimation value through a moving average of the speed estimation value.

(7) According to another aspect of the present invention, the phase advance correction circuit has means for performing the error correction of the phase advance correction quantity in accordance with the detection value of the variation tendency of the speed estimation value and the detection value of the direct current of the inverter.

(8) According to another aspect of the present invention, the pseudo current type 120 degree conduction inverter further comprises: selecting means for bypassing the phase advance correction of the phase advance correction circuit when the detection value of the variation tendency of the speed estimation value or the detection value of the direct current of the inverter varies abruptly.

(9) According to another aspect of the present invention, the pseudo current type 120 degree conduction inverter further comprises: means for prolonging an overlap time of the gate signals of the inverter then prolonging a commutation time of an output current of the inverter to generate the 120 degree conduction pattern.

(10) According to another aspect of the present invention, the pseudo current type 120 degree conduction inverter further comprises: means for adjusting the overlap time on the basis of the motor revolution speed estimation value and the detection value of the direct current of the inverter.

(11) According to another aspect of the present invention, the pseudo current type 120 degree conduction inverter further comprises: means for providing a delay phase to the terminal voltage detection value of the motor and matching an inner induced voltage phase with an output current phase of the inverter before the phase advance correction by the phase advance correcting means.

(12) According to another aspect of the present invention, the pseudo current type 120 degree conduction inverter further comprises: means for determining a correction quantity for the delay phase using the detection value of the direct current of the inverter and the estimation value of the motor revolution speed.

BRIEF DESCRIPTION OF THE DRAWINGS

FIG. 3 shows vector diagrams of inner induced voltage $E_0$, a current I, and a terminal voltage V of a PM motor.

BEST MODE FOR CARRYING OUT THE INVENTION

First Embodiment

Figure 1:
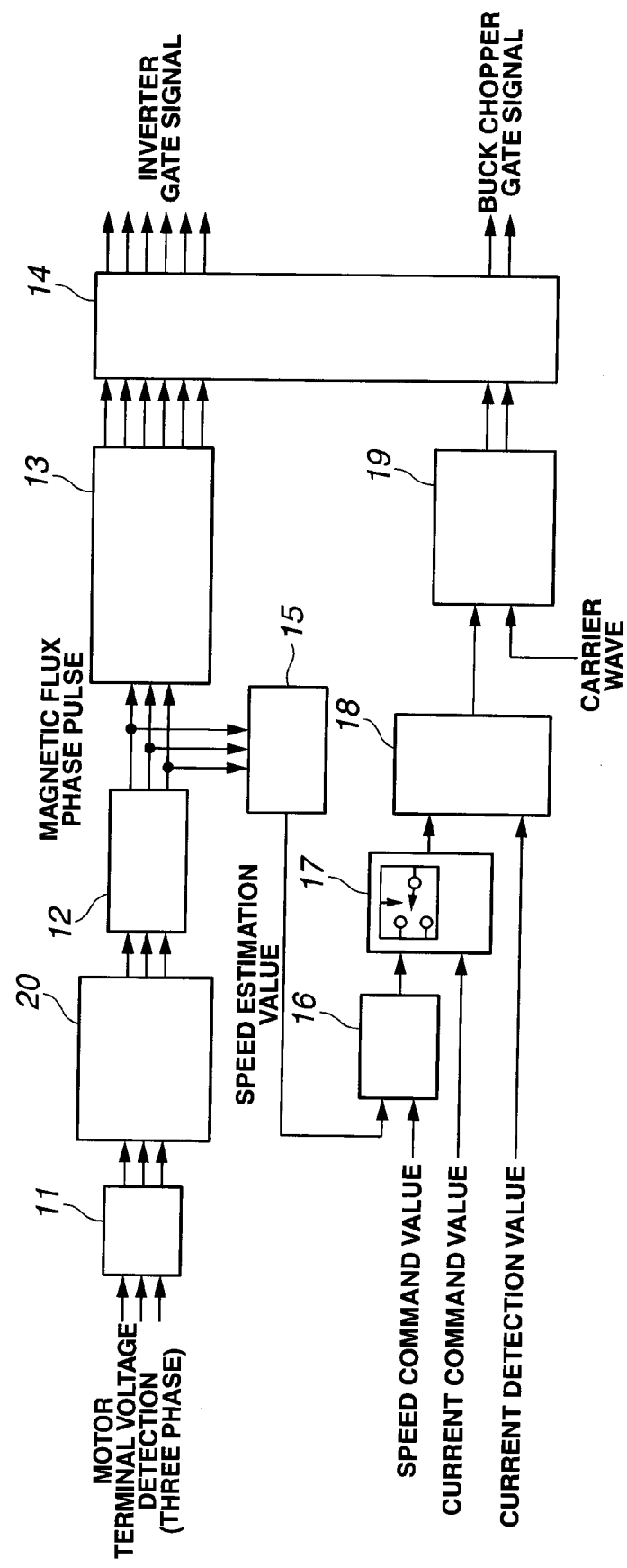
FIG. 1 shows a block diagram of a controller of a pseudo current type 120-degree conduction inverter representing a first preferred embodiment according to the present invention.
Figure 16:
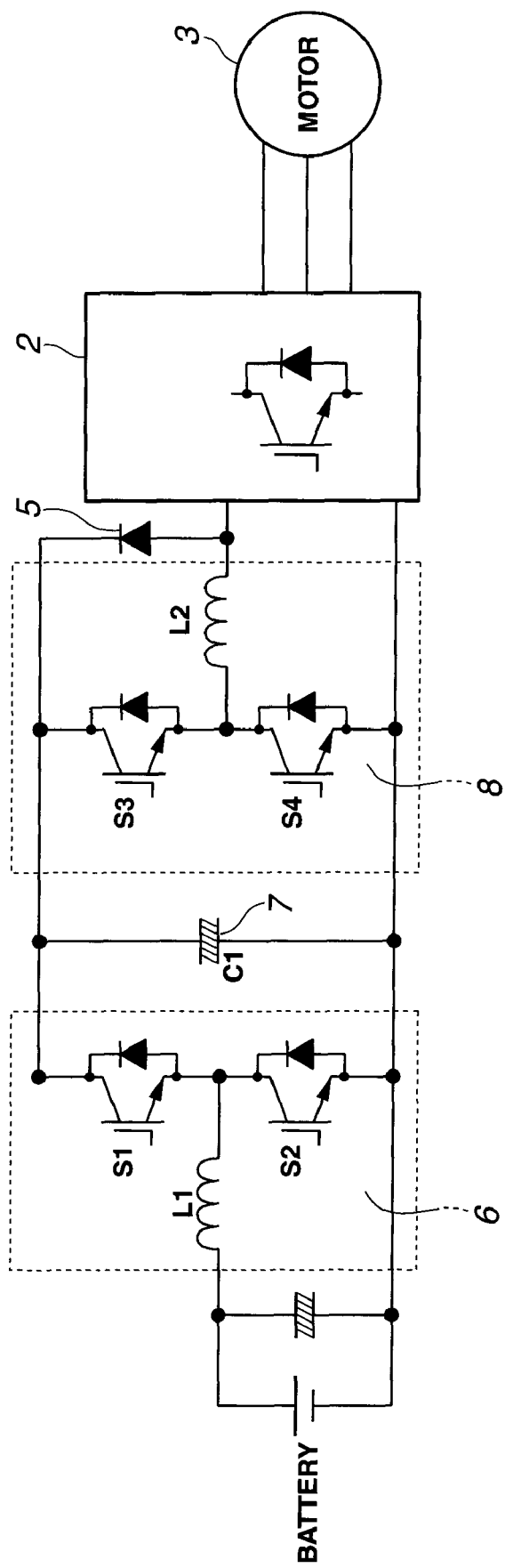
FIG. 16 shows another form of the pseudo-current source 120 degree conduction inverter shown in FIG. 15.
Figure 17:
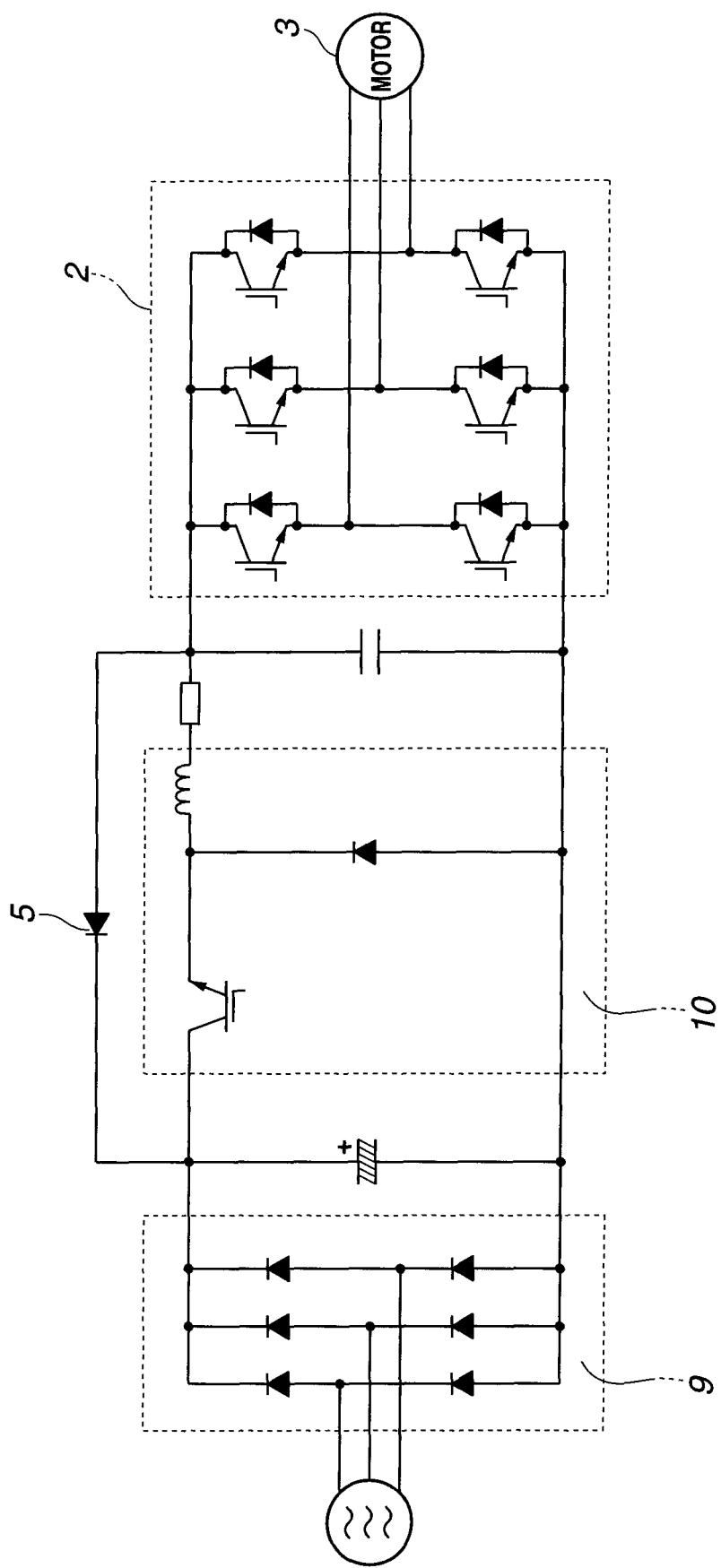
FIG. 17 shows another form of the pseudo current type 120-degree conduction inverter shown in FIG. 15.

FIG. 1 shows a block diagram of a first preferred embodiment of a controller of a pseudo current type 120-degree conduction inverter (or pseudo-current source 120 degree conduction inverter). It should be noted that a main circuit of the inverter is not limited to a basic circuit structure shown in FIG. 15. The main circuit structure is constituted by a direct current voltage power supply from a low voltage battery as shown in FIG. 16 via a boost circuit. However, the main circuit structure may be modified such as a rectifying circuit from a three-phase alternating current power supply as shown in FIG. 17, or may appropriately be modified.

In FIG. 1, detection values (three-phase waveforms) of three-phase terminal voltages of the inverter (or a connected motor) are converted into a magnetic flux phase information through an integration circuit 11 designed to have an integration characteristic for all speed regions from a low speed region to a high speed region. Then, the magnetic flux phase information (three-phase waveforms) is compared with zero in a zero crossing method by means of a zero cross comparator 12 to obtain magnetic flux phase pulses (or magnetic flux phase digital values). Gate signals for a gate drive circuit 14 of a current source 120 degree conduction inverter are generated via a logic conversion section 13 generating a 120 degree conduction pattern from the magnetic flux phase pulses. In addition, a speed estimation calculation section 15 uses a counter or so forth to obtain a revolution speed estimation value of the motor from the magnetic flux phase pulses.

Figure 15:
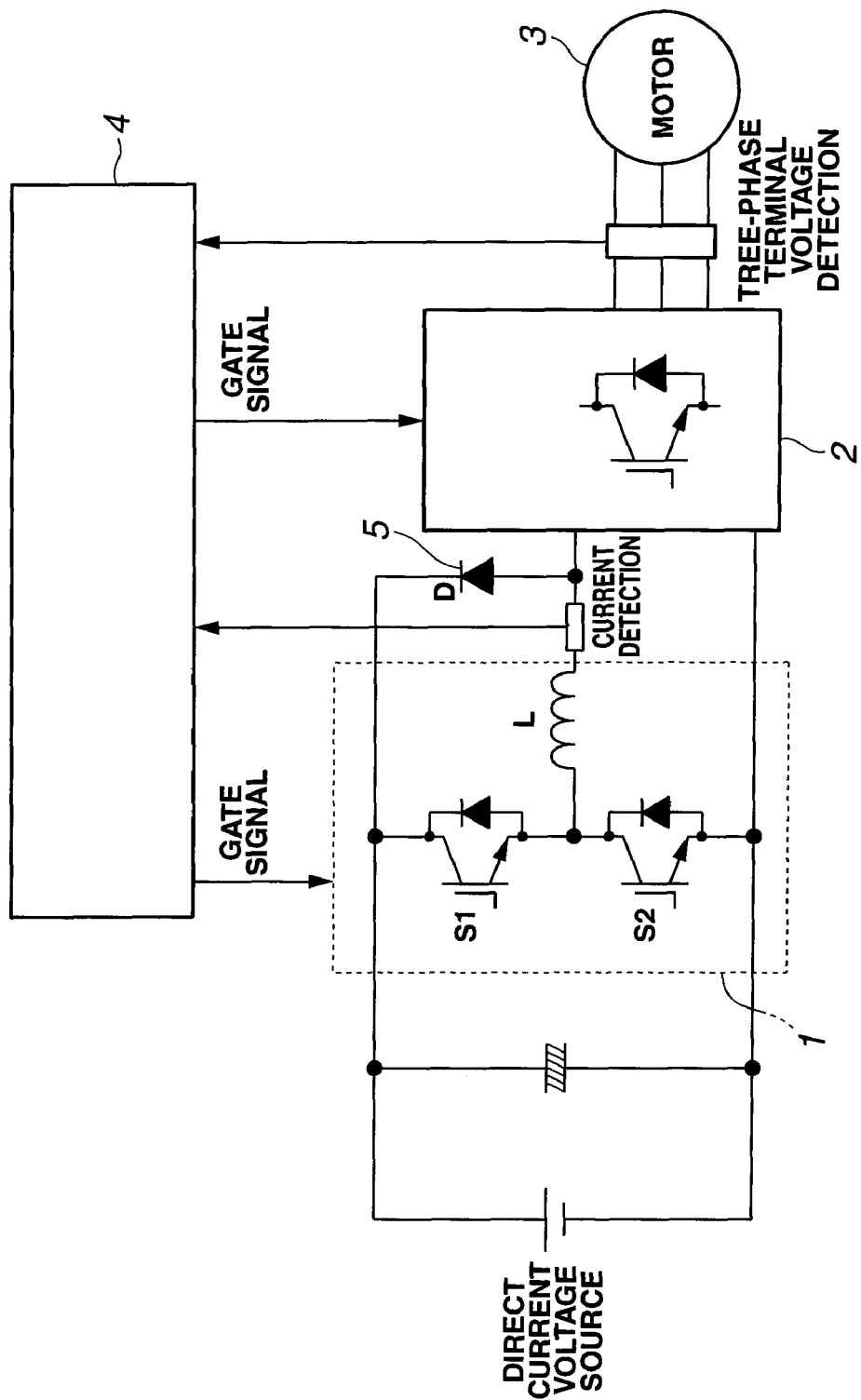
FIG. 15 shows a basic circuit structure example of the pseudo current type 120-degree conduction inverter.

A buck chopper 1 shown in FIG. 15 serves to control a current flowing through a reactor L. The following will describe the current control described above. A current command value is generated by means of a speed control system in which a speed control section 16 compares a speed command value issued from an upper rank speed controller or so forth with a speed estimation value estimated by a calculation section 15. Or alternatively, the current command value is generated by directly selecting an external current command value by a selector 17. One of the current command values selected by selector 17 provides the current command value for current control section 18. This current command value is compared with a detection value of the current of the inverter to obtain controlled variable of the current. The detection value of the current is obtained from a current detector such as a current sensor by means of which the current flowing through reactor L in chopper 1 is detected. A PWM generation section 19 performs a PWM control by means of a carrier comparison using an output of current control section 18 and the carrier wave and a gate drive circuit 14 (in which a dead time is inserted) generates the gate signals of buck chopper 1.

In the above-described circuit structure, a magnitude of the motor current is adjusted by means of buck chopper 1 and the current phase can be controlled by 120 degree conduction inverter 2.

Figure 2:
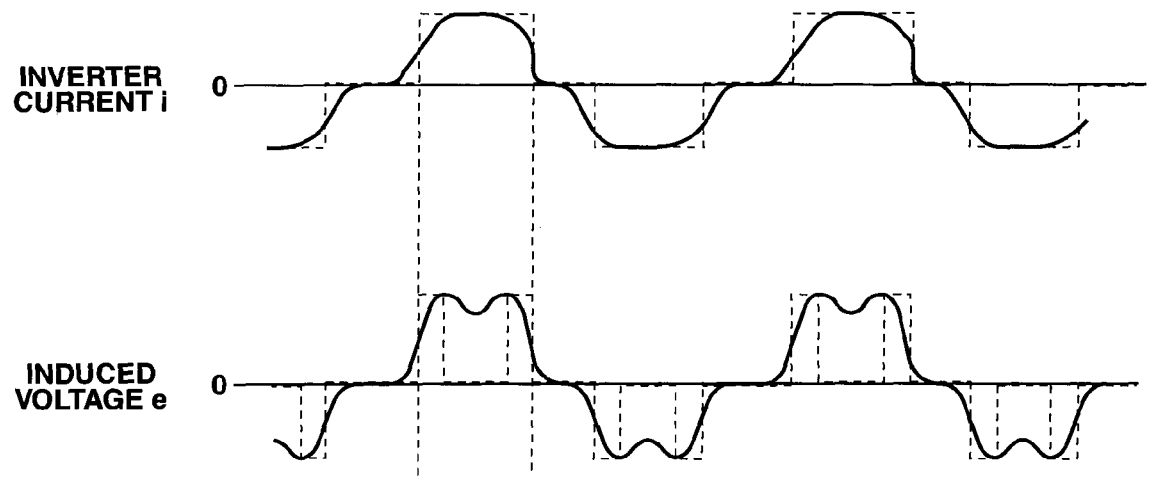
FIG. 2 shows current and voltage waveforms in the pseudo current type 120-degree conduction inverter.
Figure 4:
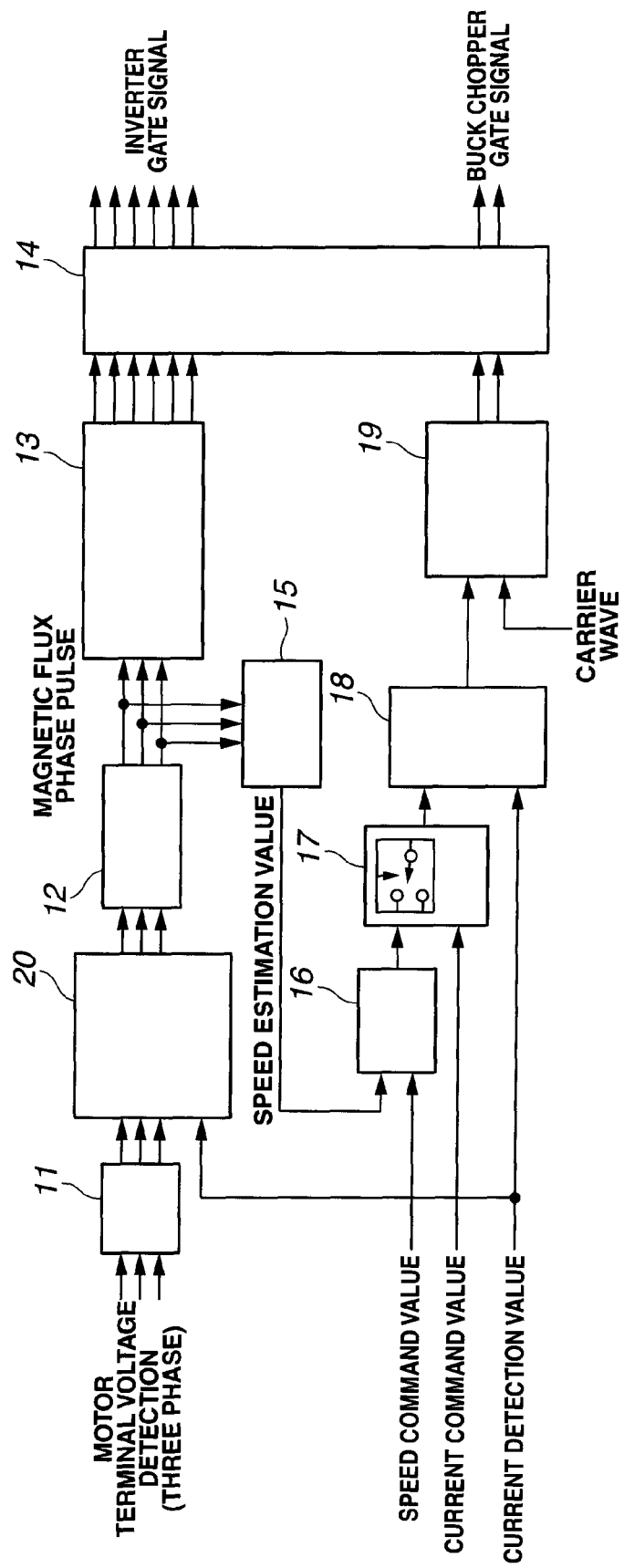
FIG. 4 shows a block diagram of the controller of the pseudo current type 120-degree conduction inverter representing a second preferred embodiment according to the present invention.

In this embodiment, a phase advance correction circuit 20 is interposed between integration circuit 11 and zero cross comparator 12 as current phase controlling means. The current phase control by means of this phase advance correction circuit 20 will hereinafter be explained FIG. 2 shows an actual current i in the pseudo-current source 120 degree conduction inverter and an induced voltage e according to the actual current i therein. Theoretically, these current and induced voltage waveforms are waveforms denoted by dot lines. However, actually, current i provides a waveform having a gradient due to a presence of an inductance component of the motor and a circuit inductance component. Since, for an interval of time during which the current and induced voltage waveforms have gradients, the field-weakening control can be carried out by the current phase adjustment, a phase advance correction circuit 20 constituted by a differentiator is inserted at a position shown in FIG. 1 to provide a phase advance for original magnetic flux phase pulses.

This differentiator can be constituted by a differentiator using an operational amplifier in a case of an analog circuit. In a case where a controller of the pseudo-current source 120 degree conduction inverter inputs the signal through an analog-to-digital conversion value to perform a digital calculation, this differentiator can be constituted by a digital differentiator. In addition, a gain of the differentiator becomes larger as an input signal frequency becomes higher and the phase advance correction quantity becomes larger as the input signal frequency becomes higher. On the other hand, since the induced voltage becomes higher along with the increase in the number of revolutions of the PM motor, a high revolution speed region of the PM motor is a region requiring the field-weakening. Hence, the differentiation gain of the differentiator may be determined to match a maximum phase advance correction quantity of phase advance correction circuit 20 with a maximum frequency of the motor.

FIG. 3($a$) shows a vector diagram representing a relationship from among an inner induced voltage $E_0$ per phase of the PM motor, a current I per phase of the motor, and a motor terminal voltage V per phase of the PM motor when the phase advance is not carried out. In this FIG. 3($a$), a motor leakage resistance is very small and can be neglected and only the influence of a leakage inductance L is taken into consideration. Next, FIG. 3($b$) shows a vector diagram in a case where a phase of motor current I is advanced. An absolute value of motor terminal voltage V can be reduced as compared with a case of FIG. 3($a$) in which the phase advance is not carried out. Hence, apart from a field-weakening effect, an effect of suppression of the motor terminal voltage itself can be provided according to a relationship between the leakage inductance component of the motor and the phase advance correction.

As described hereinabove, in this embodiment, the use of the differentiator permits the phase advance for the magnetic flux phase pulses. Consequently, the field-weakening of the motor induced voltage and the terminal voltage can be suppressed. Therefore, a voltage saturation problem which could generate when the induced voltage is raised at a high revolution time of the motor (a state in which the drive torque cannot be developed) can be relieved and the torque can be obtained even under the high revolution region.

Second Embodiment

In the first embodiment, the phase correction quantity is automatically determined in accordance with a motor frequency (a motor terminal voltage frequency). As shown in FIGS. 3($a$) and 3($b$), the terminal voltage has a phase difference with respect to the actual induced voltage. As the load becomes high, the phase difference therebetween becomes large and an absolute value of the terminal voltage also becomes large. In other words, there is a tendency of a potential difference of the terminal voltage with respect to a direct current voltage supply of the inverter being reduced, in a region requiring a torque current.

Therefore, in this embodiment, the phase advance correction quantity of phase advance correction circuit 20 is adjusted with the detection value of the direct current (the current flowing through reactor L of buck chopper 1) corresponding to a motor load current (an armature current of the motor connected to the inverter) as a parameter. This adjustment is made as follows: the gain of the differentiator constituting phase advance correction circuit 20 is adjusted in such a manner that, as the detection value of the direct current (of buck chopper 1) becomes larger, the phase advance correction quantity becomes larger.

According to the second embodiment, the differentiation characteristic in accordance with the load is provided not only using the estimation value of the motor revolution speed but also using the direct current detection value corresponding to the motor load current. Hence, the adjustment of the phase advance correction quantity can be made and the rise of the terminal voltage during the high load current flow can be suppressed.

Third Embodiment

Figure 5:
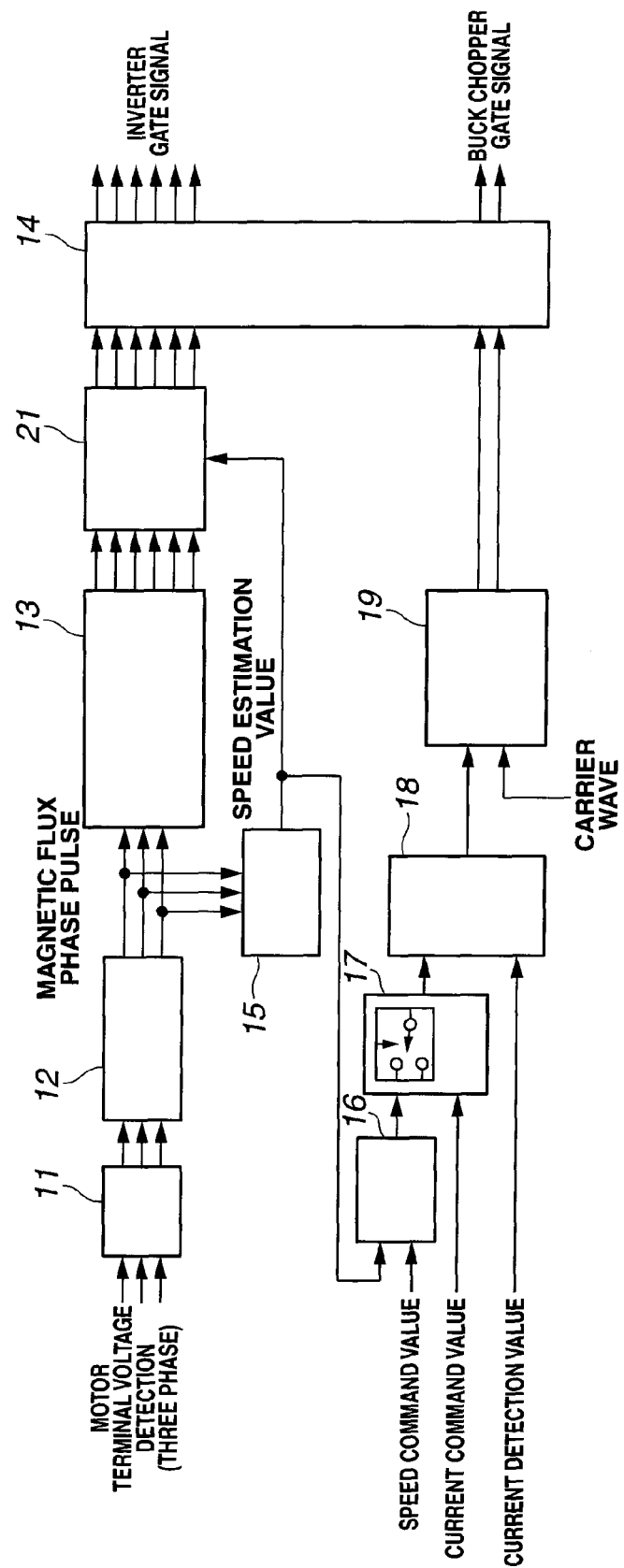
FIG. 5 shows a block diagram of the controller of the pseudo current type 120-degree conduction inverter representing a third preferred embodiment according to the present invention.

The differentiator is used in the first embodiment. However, in a third preferred embodiment, a phase advance correction circuit 21 which performs a phase advance correction on the basis of a present speed estimation value is installed for 6 step pulses which provides the output of logic conversion circuit 13 generating 120 degree conduction pattern, as shown in FIG. 5.

Figure 6:
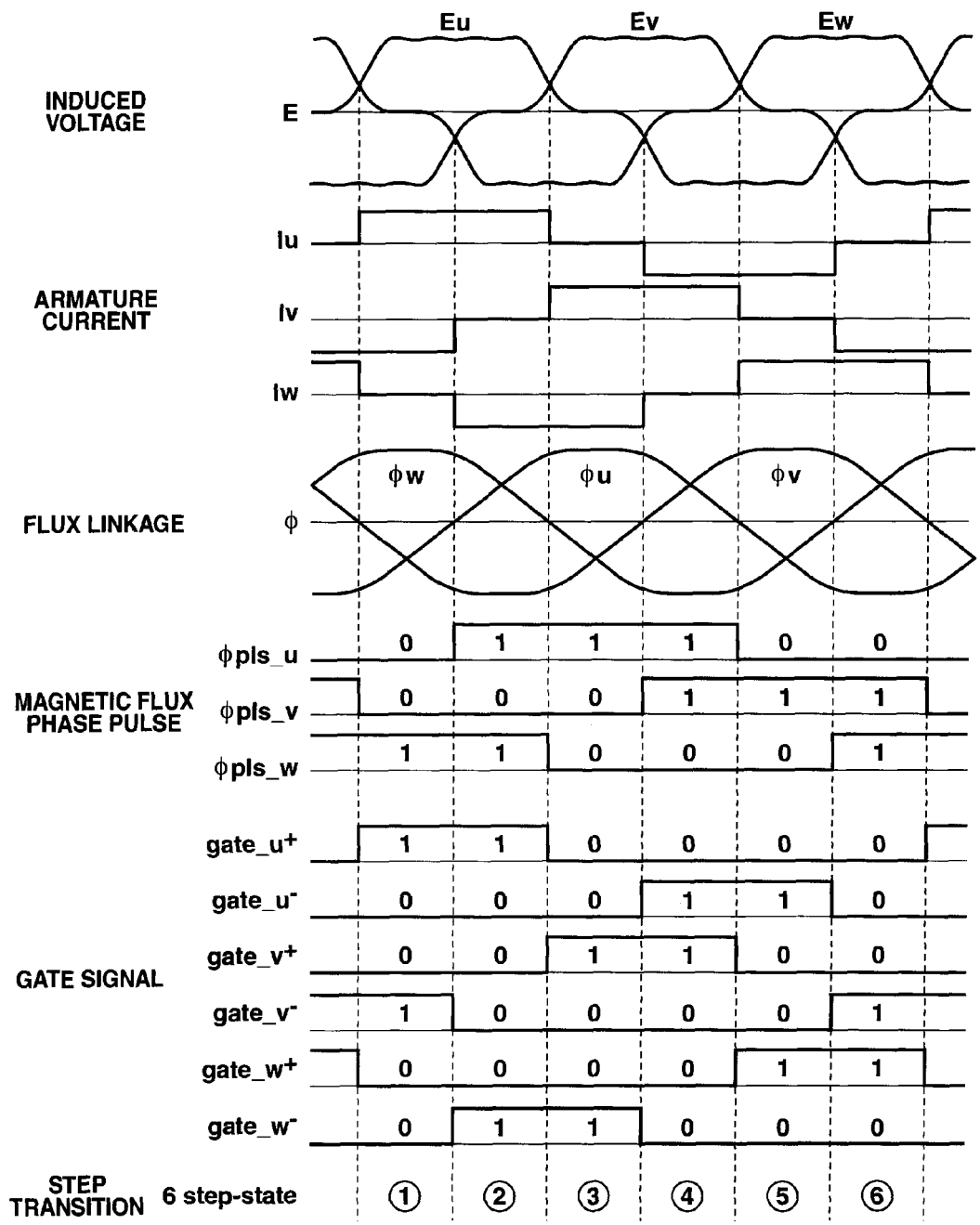
FIG. 6 shows an example of a magnetic flux phase and a 120 degree conduction pattern.

FIG. 6 shows an example of the magnetic flux phase pulses and 120 degree conduction pattern in the pseudo-current 120 degree conduction inverter. Phase advance correction circuit 21 determines a timing that is delayed from a rising edge timing of the gate signal pulse of 120 degree conduction pattern shown in FIG. 6 in accordance with the speed estimation value by means of a delay counter, and this delayed timing is set to the rising edge timing of the subsequent gate signal pulse (a gate signal pulse which is to be outputted at the subsequent step transition), then phase advance corrected-gate signal is generated.

Figure 7:
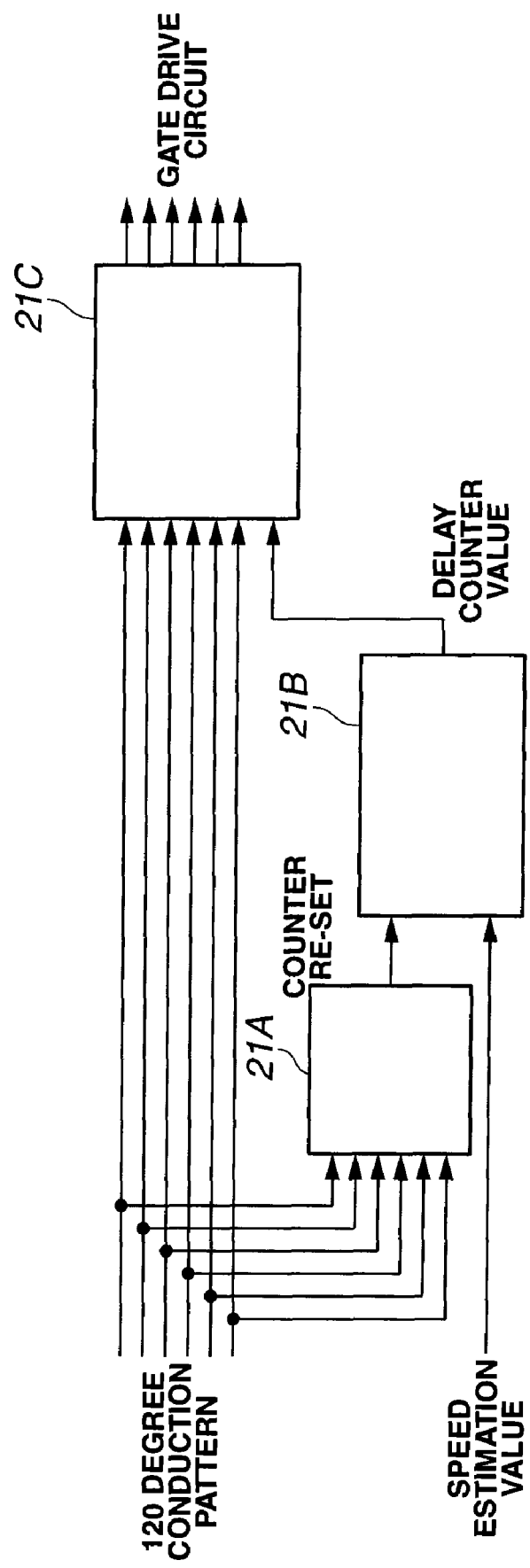
FIG. 7 shows a block diagram representing a phase advance correction circuit 21 in the third embodiment shown in FIG. 5.

FIG. 7 shows a block diagram of phase advance correction circuit 21. A rising edge detection circuit 21A detects a rising edge of the 120 degree conduction pattern. A speed-counter value conversion table 21B resets the delay counter on a rising edge detected by rising edge detection circuit 21A, with a default value which is a table data preset on the basis of the speed estimation value set into the delay counter. "0" is obtained in the delay counter after a time proportional to this default value. Next, a step transition determination and delay processing section 21C determines one of gate signals to be outputted at the subsequent step transition timing. At a timing at which the delay counter indicates "0", the subsequent one of the gate signals is caused to rise to provide a phase advanced gate drive signal for the gate drive circuit.

Figure 8:
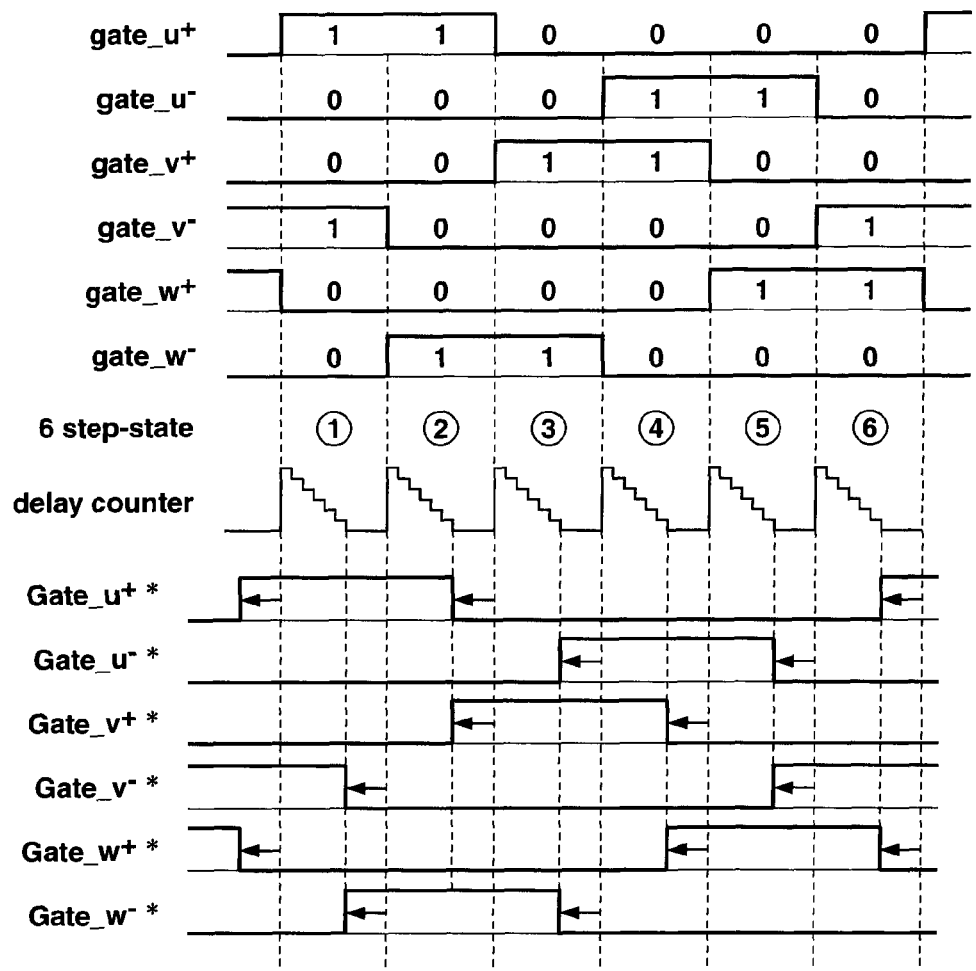
FIG. 8 shows phase advance corrected gate signals.

FIG. 8 shows a pattern of the phase advance corrected gate signals carried out in the third embodiment. Each of rising edges of the 6 step pulses is detected from original 120 degree conduction pattern and a count down is started from a default value of the delay counter (a value based on the speed estimation value information). Instantly when the value of the delay counter indicates "0", the subsequent one of the gate signals rises in a rectangular pulse form. The default value of the delay counter may use the speed estimation value information which is smaller than ⅙ value of the inverter period. Consequently, each phase of the gate signal pulses is corrected as the phase advance manner, as shown in FIG. 8.

The above-described counter generating means is exemplified as means for performing the phase advance than the original gate signal pulses with respect to the subsequent rising edge of the gate signals generated at ⅙ period. The phase advance correction is carried out on the basis of a falling edge timing of the gate signal pulses.

In this third embodiment, a phase advance adjustment can more easily become possible by means of the delay counter installed within an internal of a digital device such as controller 4 shown in FIG. 15 without insertion of the analog differentiator.

Fourth Embodiment

Since, in the third embodiment, the speed information is read at a timing of ⅙ period to predict the rise of the subsequent one of the gate signals and perform the phase adjustment for the subsequent gate signal, there is a possibility that in a case where a motor speed variation while the speed information is read is so large that a predicted value is largely different from the correction quantity. Therefore, in this embodiment, the speed variation is read from the speed estimation value to be reflected on the phase adjustment quantity.

Figure 9:
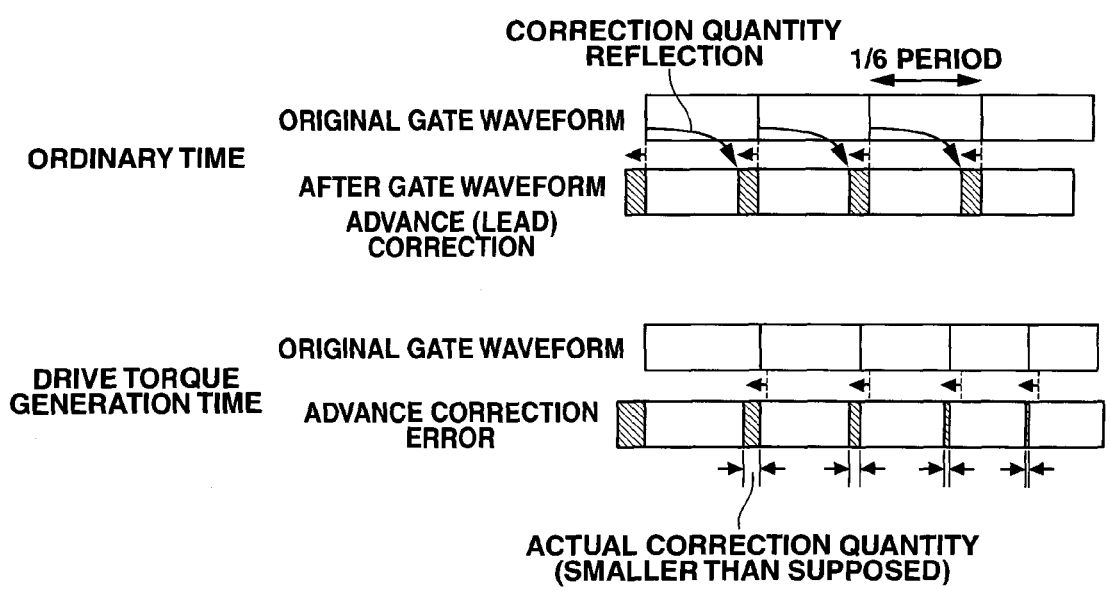
FIG. 9 shows an example of an actual correction quantity by a motor drive torque.

For example, in a case where a motor drive torque command is given, a time duration of the ⅙ period becomes gradually short along with a rise in the motor speed. The rate of the phase advance correction value to ⅙ period, in the case of the present speed information read at the time of the rising edge of one previous gate signal, becomes smaller, since ⅙ period becomes shorter. The excessively large speed variation quantity mat result, in tern, in a phase delay. FIG. 9 shows a situation described above. It will be appreciated from FIG. 9 that there is an error for the supposed phase advance quantity and the actual advance phase quantity becomes gradually small.

Figure 10:
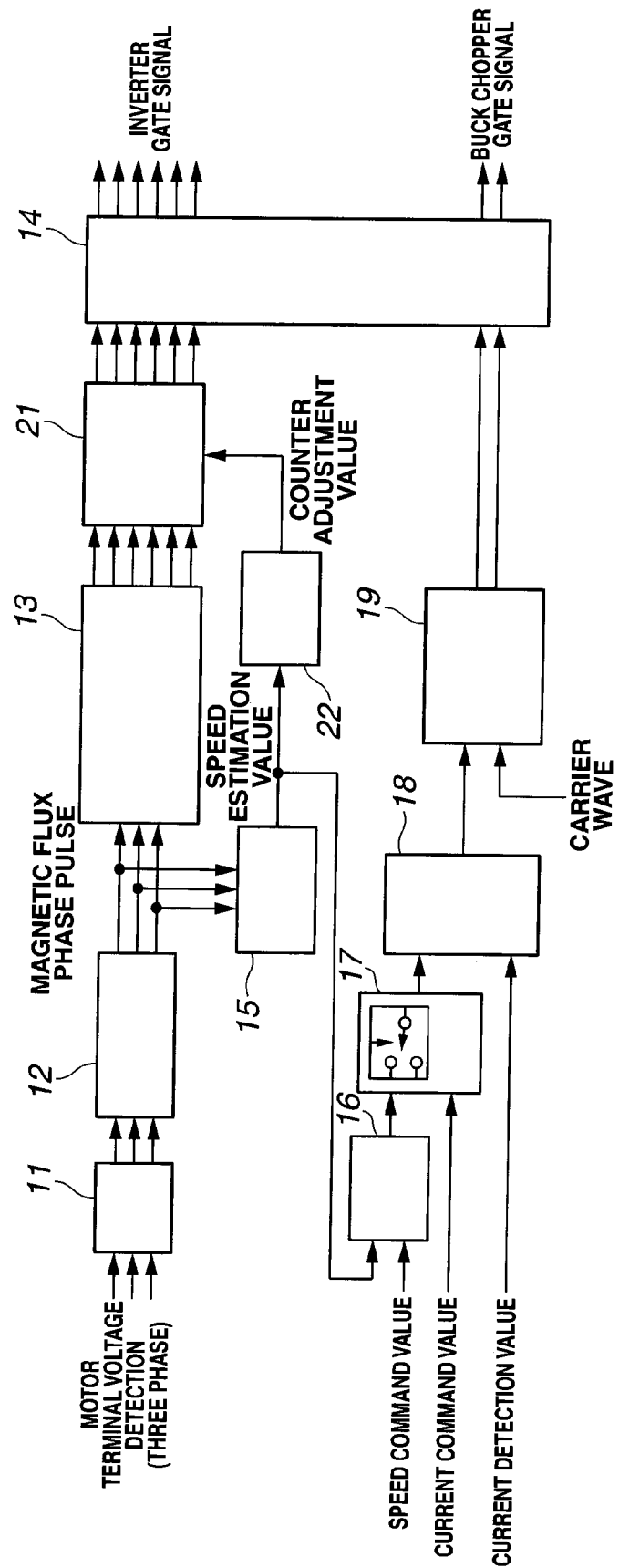
FIG. 10 shows a block diagram of the controller of the pseudo current type 120-degree conduction inverter representing a fourth preferred embodiment according to the present invention.

Therefore, in this embodiment, as shown in a block diagram in FIG. 10, a variation value detection circuit 22 reads a variation tendency of the motor speed estimation value from a moving average processing and performs a further phase correction against the above phase advance error. For example, in the block diagram of FIG. 10, since a phase advance quantity becomes insufficient during the drive (during the rise in the revolution speed), the further phase correction is performed to increase the phase advance correction quantity with the speed variation value by the moving average processing being a parameter. The correction quantity could be in a table format from an empirical value.

In this embodiment, the phase adjustment can be made during the occurrence of the speed variation in addition to the advantages that the third embodiment can achieve.

Fifth Embodiment

The phase adjustment is made only from the information of the speed estimation value in the third and fourth embodiments. However, in the same way as the second embodiment, the absolute value of the terminal voltage is dependent upon the direct current (flowing through reactor L of buck chopper 1).

Figure 11:
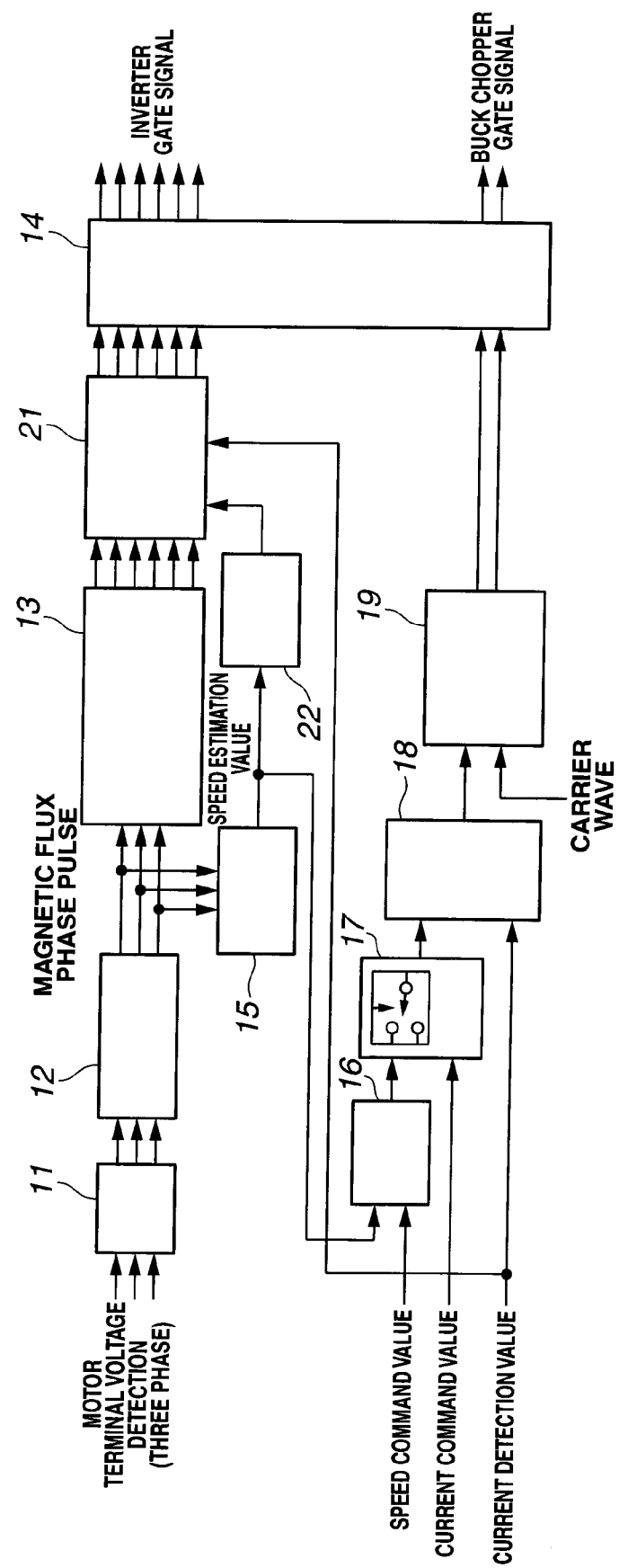
FIG. 11 shows a block diagram of the controller of pseudo current type 120-degree conduction inverter representing a fifth preferred embodiment according to the present invention.

Hence, in a phase advance correction table as shown in FIG. 11, the phase correction quantity can be determined using a two-dimensional table with the direct current detection value and the speed estimation value as parameters. The phase adjustment can be made in accordance with the load current in addition to the advantages of the third and fourth embodiments.

Sixth Embodiment

The technique described in each of the third, fourth, and fifth embodiments is such that the error in a case where the speed variation is very large or in a case where the torque variation (direct current quantity) is very large is corrected. If an error compensation quantity is to erroneous, there is a possibility of causing an unexpected operation (for example, a step out of the PM motor and so forth).

Figure 12:
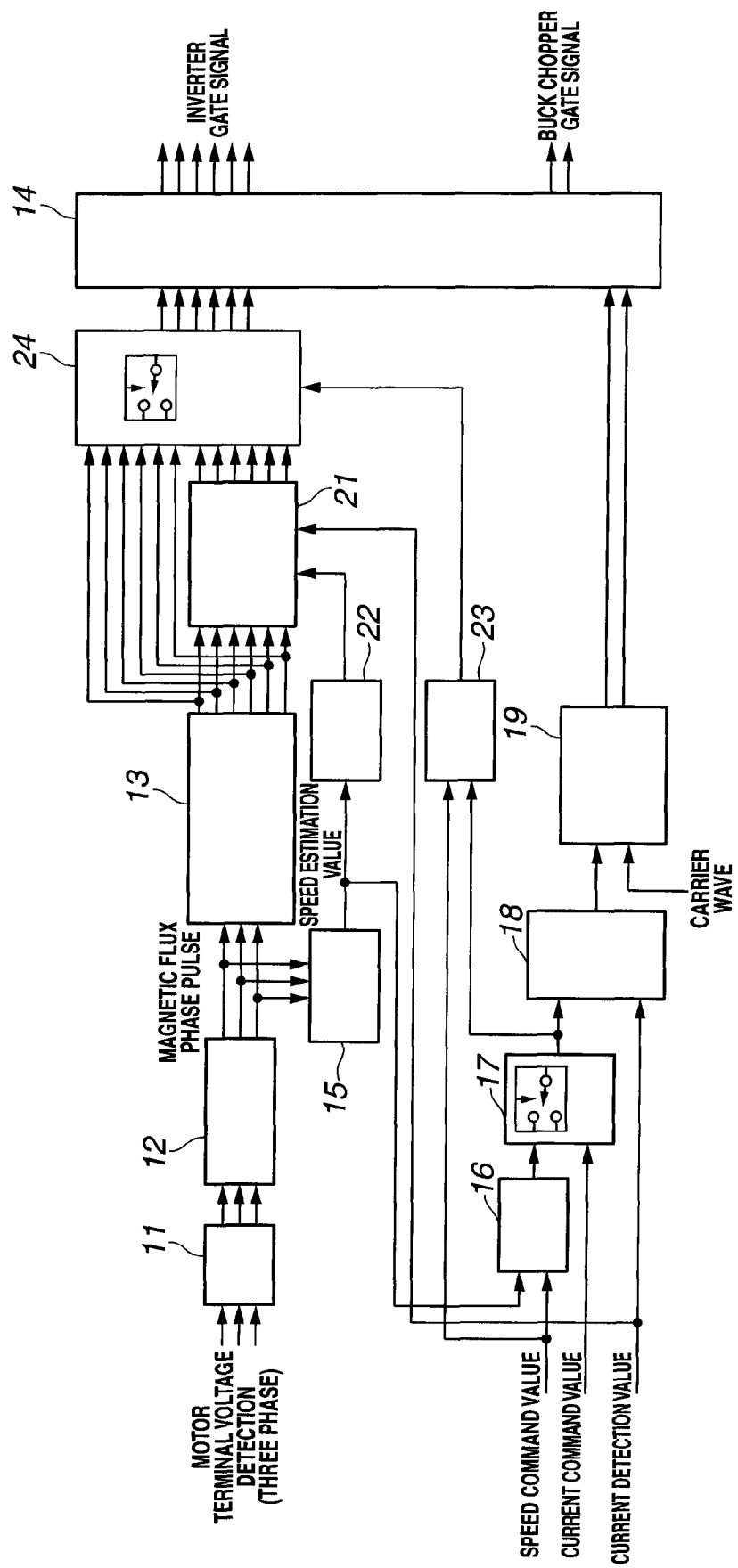
FIG. 12 shows a block diagram of the pseudo current type 120-degree conduction inverter representing a sixth preferred embodiment according to the present invention.

Thus, in a sixth preferred embodiment, as shown in FIG. 12, the information of the speed command value and the direct current command value provided from the upper rank controller is detected by a variation value detection section 23. If this variation is very large, the phase advance correction processing in each of the third, fourth and fifth embodiments is bypassed through a selector (a selection circuit) 24.

In the sixth embodiment, a possibility of causing an unexpected operation such as the step out of the motor during the abrupt change in the speed or in the load can be avoided.

Seventh Embodiment

In a case of the pseudo-current source 120 degree conduction inverter, a gradient of a current occurs during a time interval (a commutation time) at which one of the phases of the inverter causing the current flow is commutated. The induced voltage can be controlled according to the phase control although it is slight for the time interval for the inverter current having the gradient.

In this embodiment, to make the effect of the gradient of the current remarkable, the commutation time is, positively, prolonged. That is to say, overlap times of the gate signals of the inverter are prolonged.

Figure 13:
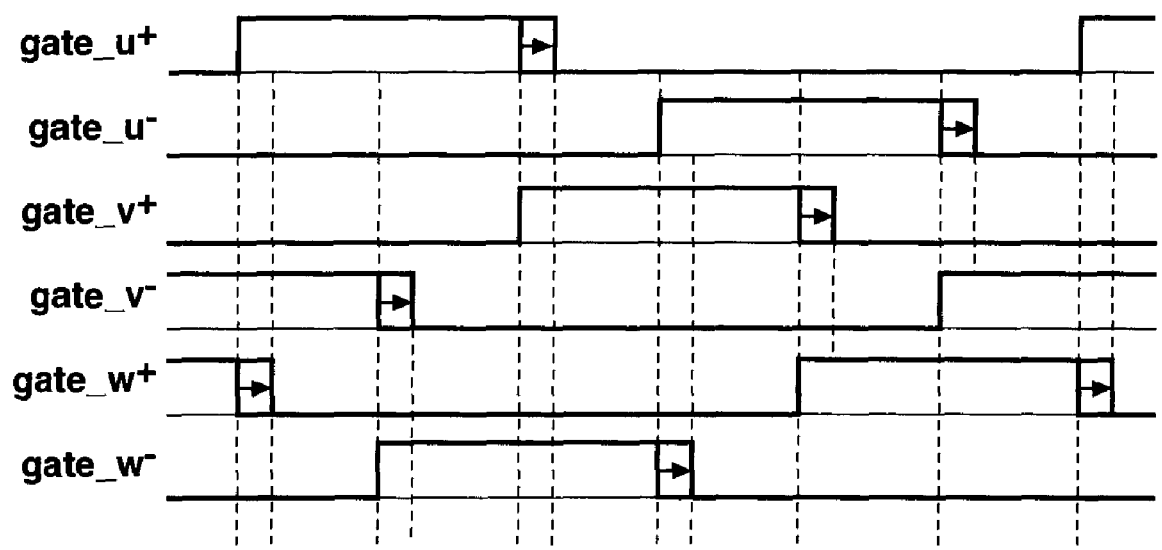
FIG. 13 shows an example of overlapped gate signals.

FIG. 13 is an example of the overlapped gate signals. 120 degree conduction pattern logic conversion section 13 delays the rising edge timings of the gate signals by an arbitrarily set time.

According to the seventh embodiment, the commutation time of the output current of the inverter is, positively, set to be prolonged. Thus, the gradient of the current is adjusted to achieve the terminal voltage suppression effect through this phase adjustment.

Eighth Embodiment

The overlap time duration is adjusted using a table with the motor revolution speed estimation value and the detection value of the direct current flowing through the reactor of buck chopper 1 as parameters, during a setting of the overlap time duration in the seventh embodiment.

In the case of the pseudo-current source inverter, if the rate of the overlap time with respect to the fundamental wave period is too large, a spike voltage output time during the commutation time becomes long. Thus, there is a possibility of making an operation of a position sensor-less system detecting the terminal voltage to determine the phase unstable. From this reason, the overlap time is desirably adjusted in accordance with the load current and the speed.

In the eighth embodiment, the commutation time can be adjusted in accordance with the motor speed and the load current in addition to the advantages that the seventh embodiment can achieve. An unstable state for the terminal voltage detection and the integration operation when the position sensor-less control is performed can be avoided.

Ninth Embodiment

It is desirable to control the pseudo-current source 120 degree conduction inverter to match the motor current phase with the inner induced voltage, in a case where an improvement in the efficiency is to be considered. As shown in FIG. 3, the phase error is provided for the inner induced voltage phase. This phase error is caused by the leakage inductance of the motor and the leakage inductance. In a case where the current phase matched with the detection value of the terminal voltage is directly controlled without the phase compensation, the current having the phase error with respect to the induced voltage is, as a consequence, caused to flow.

Thus, in this ninth embodiment, with the influence of the phase error due to the leakage inductance of the motor taken into consideration, the delay phase is provided for the detection value of the terminal voltage and the phase advance correction according to each of the first through eighth embodiments is performed with the inner induced voltage phase of the motor matched with the output current phase of the inverter.

Figure 14:
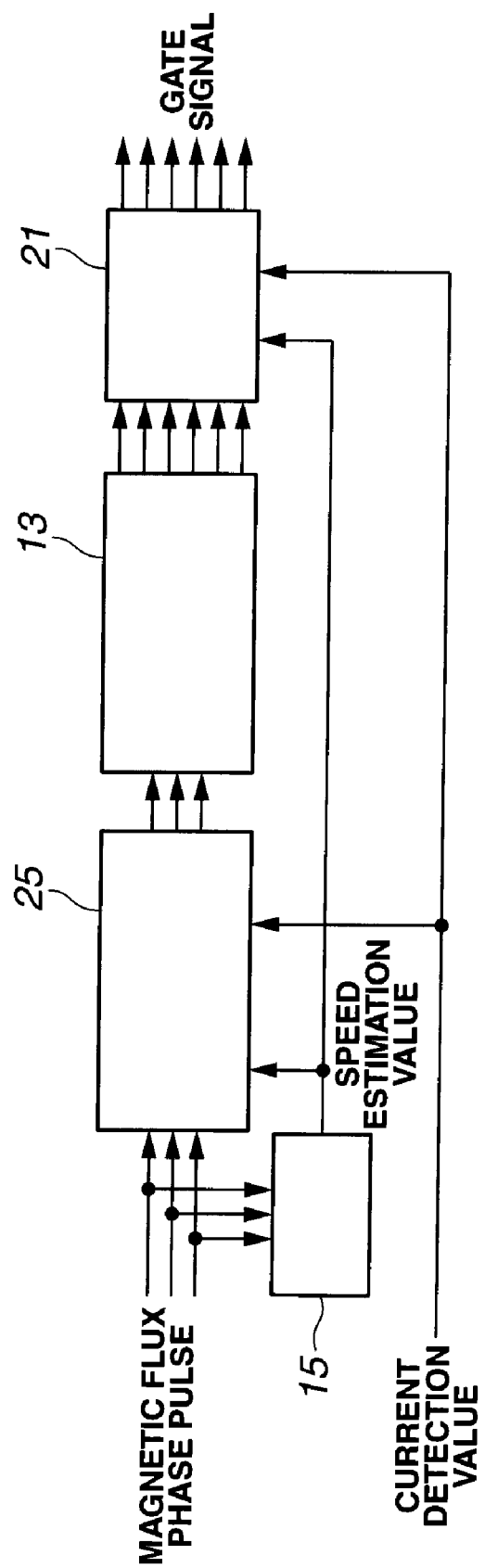
FIG. 14 shows a circuit example of a phase error correction with respect to the induced voltage representing an eighth preferred embodiment according to the present invention.

The correction quantity is determined using the direct current detection value and the motor speed estimation value for the delay phase correction. After the correction according to the motor parameter is performed, the correction in the above-described embodiment is performed. FIG. 14 shows the structure in a case where the advance phase correction is made by means of a counter after the error with respect to the induced voltage is corrected in a phase error correction section 25.

Thus, the influence of the phase error due to the motor leakage inductance in the phase advance correction can be avoided, in the ninth embodiment.

As described hereinabove, the phase advance correction is performed for the magnetic flux phase information from which the 120 degree conduction pattern of the inverter is obtained with the terminal voltage of the motor as a reference phase. Thus, the current phase adjustment is assured and facilitated so that the field-weakening control of the motor can be performed or the terminal voltage saturation of the motor during the high-speed drive of the motor can be suppressed.

What is claimed is:

1. A pseudo current type 120 degree conduction inverter, comprising:
    means for detecting a motor magnetic flux phase from terminal voltage detection signals of a motor;
    means for generating gate signals of the inverter from a 120 degree conduction pattern on the basis of the magnetic flux phase;
    means for controlling a magnitude of an output current of the inverter through an estimation of a motor revolution speed based on the magnetic flux phase; and
    phase advance correcting means for performing a phase advance correction of the detected magnetic flux phase then performing a field-weakening control of the motor or suppressing a terminal voltage saturation of the motor.

2. The pseudo current type 120 degree conduction inverter as claimed in claim 1, wherein the phase advance correcting means is a differentiator that differentiates the terminal voltage detection signal of the motor.

3. The pseudo current type 120 degree conduction inverter as claimed in claim 1, further comprising:
    means for detecting a direct current of the inverter and adjusting a phase advance correction quantity of the phase advance correcting means in a manner that, as a detection value of the direct current of the inverter becomes larger, the phase advance correction quantity of the phase advance correcting means becomes larger.

4. The pseudo current type 120 degree conduction inverter as claimed in claim 1, wherein the phase advance correcting means is a phase advance correction circuit which determines a timing that is delayed from a timing of a rising edge or a falling edge of the gate signal pulse of the 120 degree conduction pattern in accordance with a motor speed estimation value by means of a delay counter, and which sets the delayed timing to the timing of the rising edge of a subsequent gate signal pulse.

5. The pseudo current type 120 degree conduction inverter as claimed in claim 4, wherein the phase advance correction circuit has phase advance error correcting means for detecting a variation tendency of the motor speed estimation value and performing a phase advance error correction of the phase advance correction quantity.

6. The pseudo current type 120-degree conduction inverter as claimed in claim 5, wherein the phase advance error correcting means detects the variation tendency of the speed estimation value through a moving average of the speed estimation value.

7. The pseudo current type 120 degree conduction inverter as claimed in claim 5, wherein the phase advance correction circuit has means for performing the error correction of the phase advance correction quantity in accordance with the detection value of the variation tendency of the speed estimation value and the detection value of the direct current of the inverter.

8. The pseudo current type 120 degree conduction inverter as claimed in claim 4, further comprising:
   selecting means for bypassing the phase advance correction of the phase advance correction circuit when the detection value of the variation tendency of the speed estimation value or the detection value of the direct current of the inverter varies abruptly.

9. The pseudo current type 120 degree conduction inverter as claimed in claim 1, further comprising:
   means for prolonging an overlap time of the gate signals of the inverter then prolonging a commutation time of an output current of the inverter to generate the 120 degree conduction pattern.

10. The pseudo current type 120 degree conduction inverter as claimed in the claim 9, further comprising:
    means for adjusting the overlap time on the basis of the motor revolution speed estimation value and the detection value of the direct current of the inverter.

11. The pseudo current type 120 degree conduction inverter as claimed in claim 1, further comprising:
    means for providing a delay phase to the terminal voltage detection value of the motor and matching an inner induced voltage phase with an output current phase of the inverter before the phase advance correction by the phase advance correcting means.

12. The pseudo current type 120 degree conduction inverter as claimed in claim 1, further comprising:
    means for determining a correction quantity for the delay phase using the detection value of the direct current of the inverter and the estimation value of the motor revolution speed.

* * * * *